United States Patent Office 3,107,978
Patented Oct. 22, 1963

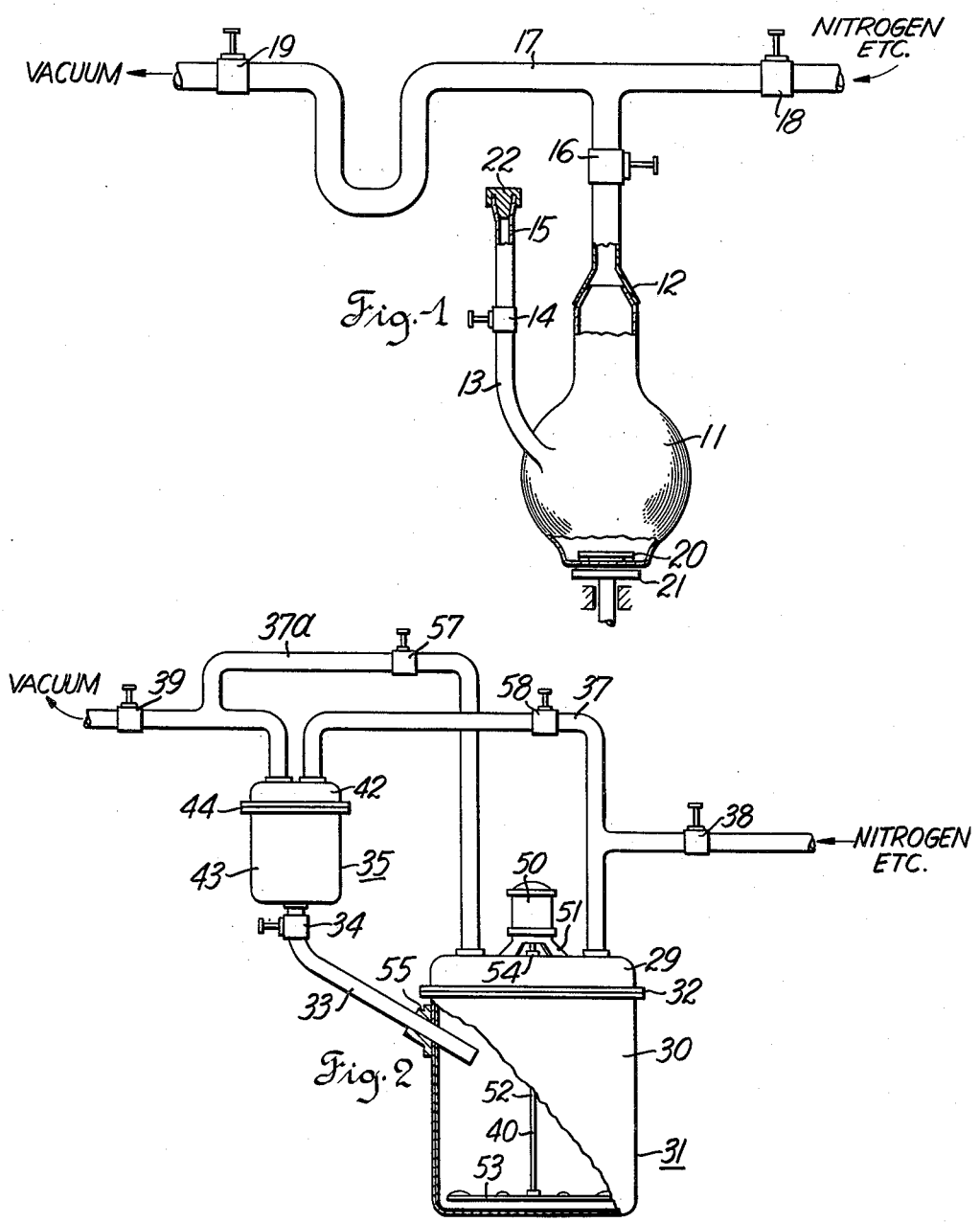

3,107,978
PREPARATION OF IRON TETRACARBONYL,
$Fe_3(CO)_{12}$
James R. Huff and Daniel T. Haworth, Milwaukee, Wis., assignors to Allis-Chalmers Manufacturing Company, Milwaukee, Wis.
Filed Oct. 17, 1960, Ser. No. 63,129
7 Claims. (Cl. 23—203)

This invention relates generally to iron tetracarbonyl, $Fe_3(CO)_{12}$ and more particularly to improved methods for the preparation thereof.

Iron tetracarbonyl is a useful compound both as a chemical intermediate in the preparation of antiknock compounds and in certain direct commercial uses where high purity iron is desired.

In the past great difficulty has been experienced in the preparation of iron tetracarbonyl in high enough yield and with a simple enough procedure to make its use commercially feasible.

For example, iron tetracarbonyl has heretofore been prepared by the dimerization of iron pentacarbonyl, $Fe(CO)_5$, to iron enneacarbonyl, $Fe_2(CO)_9$, which is then thermally disproportionated to $Fe_3(CO)_{12}$.

Another method of preparing iron tetracarbonyl practiced heretofore comprises mixing iron pentacarbonyl with sodium hydroxide; allowing the reacting mixture to stand 48 to 96 hours and thereafter acidifying the mixture with hydrochloric acid to form the trimer.

Both of these methods require complex procedures, considerable preparation time and even then the yields are extremely low because some of the carbonyl entities are actually destroyed by heating.

The present invention, in contrast, is predicated upon our discovery that the time of preparation is remarkably reduced and the yields increased to a remarkably unexpected extent by a process including the reaction at room temperature and in the absence of oxygen between iron pentacarbonyl and a borohydride or hydroborate of an alkali or alkaline earth metal in an inert nonaqueous solvent in the manner hereinafter described in detail.

Accordingly, one of the prime objects of the present invention is to provide a method of preparing trimeric iron carbonyl in which the elaborate and time consuming procedures of the prior practices are eliminated.

Another object of the present invention is to provide a quick method of preparing trimeric iron carbonyl which provides greater yield than methods heretofore known.

Another object of the present invention is to provide a method of preparing trimeric iron carbonyl which does not require heat and which avoids the need to form and subsequently treat the isolated trimer.

These and still other objects as shall hereinafter appear are fulfilled by the present invention to a remarkably unexpected extent as can be readily discerned from the following detailed description when read in conjunction with the accompanying drawing in which:

FIG. 1 shows suitable reaction system in which the present invention may be employed; and FIG. 2 shows a suitable reaction vessel with which the present invention may be employed for production on a larger scale.

One practice of the present invention as it might be performed on a smaller scale such as in the laboratory shall now be described, reference being had to FIG. 1 of the accompanying drawing.

A suitable reaction vessel, such, for example, as 500 ml. flask 11 having a standard taper joint 12 and a side arm 13 including a stop cock 14 and a reservoir 15, is connected through a valve 16 to a source of nitrogen or other suitable inert nonoxygen containing gas, via conduit 17 and valve 18 and to a source of vacuum, via conduit 17 and valve 19. In this fashion, the entire system including flask 11 can be flooded and all oxygen purged from the system, the purpose of which shall be described.

By "inert" as that term is used with respect to the flooding medium, we mean that the medium employed is chemically unreactive with the reagents prescribed for the reaction.

To perform the reaction, vessel 11 is charged with a borohydride or hydroborate of an alkali or alkaline earth metal such, for example, as sodium borohydride, $NaBH_4$, which may be formed into a slurry with a suitable inert nonaqueous solvent of the type hereinafter described.

With the slurry may be charged a glass coated magnetic stir bar 20. As is well known, magnetic stir bars are actuated by the movement of an externally disposed magnet or magnetic field, represented at 21, and this aspect is not believed to require further elaboration here.

After the vessel 11 is so charged, taper joint 12 is closed and defines a seal. Thereafter, valves 16 and 18 are opened whereupon the system is flooded and any oxygen which might be in the system is purged therefrom. The vacuum, placed on the system by opening valve 19, further aids by drawing any oxygen out of the system.

Thus, after evacuation of the flask 11, side arm 13 and reservoir 15, the stopcock 14 (between the flask and the side arm) and stopcock 16 (between the source of vacuum 19 and the flask 11) are both closed.

The side arm reservoir 15, which is fitted with a penetratable substantially self-sealing plug 22, is then charged in any suitable fashion such as by the insertion of the needle of a hypodermic syringe or like device (not shown) through plug 22.

One desirable charge consists of 3.6 ml. (5.4 g.) of iron pentacarbonyl, $Fe(CO)_5$, and 20 ml. of diethylene glycol dimethylether for each gram of sodium borohydride charged into flask 11. The diethylene glycol dimethylether acts as an inert solvent for the reaction, that is, it solubilizes but does not react with the reagents. Other suitable inert nonaqueous solvents which may be substituted are triethylene glycol dimethylether, liquid ammonia, n-propylamine, isopropylamine and ethylene diamine. These same solvents may also be employed with the reducing charge disposed in flask 11 as indicated above.

Side arm stopcock 14 is next opened and the iron pentacarbonyl solvent charge is slowly added to the sodium borohydride slurry in flask 11. These reagents are then suitably mixed as by actuating bar 20 with a manipulatable externally disposed magnet 21.

The solution immediately turns a deep red color, resulting from the formation of an intermediate compound and gives off a noncondensable gas. Analysis of this gas shows it is a mixture of hydrogen and carbon monoxide.

An infrared spectrum of the red solution indicated the absence of the borohydride ion absorption in the 4-micron region whereas a carbonyl complex was formed as evidenced by absorption peaks in the 4.5–5.4 micron region, noticeably shifted from the normal $Fe(CO)_5$ spectrum.

The red solution, upon acidification with a suitable non-oxidizing acid as hydrochloric acid and acetic acid changes in color to light green and dark green solid precipitates. The acid may also be added to the vessel 11 through reservoir 15 in a similar fashion to that employed for the introduction of iron pentacarbonyl thereinto.

The dark green precipitate may be readily separated from the solution as by decantation, filtration and the like. Analysis of the precipitate reveals that it is iron tetracarbonyl $Fe_3(CO)_{12}$.

The overall reaction of the iron pentacarbonyl with the borohydride and hydroborate reducing agents is found to proceed smoothly in the nonaqueous solvents. The time for completion of this reaction is three to five minutes depending, of course, on the amount of starting material.

It is, of course, understood that while the illustrated embodiment describes the preparation of iron tetracarbonyl using sodium borohydride as the reducing agent, other alkali and alkaline earth borohydrides, such as those of lithium, potassium, rubidium, magnesium, calcium, strontium and the corresponding alkoxyborohydrides such as sodium trimethoxyborohydride may be substituted therefor and will provide quite satisfactory results.

Apparatus which permits the practice of the present invention to produce larger quantities of iron tetracarbonyl is shown in FIG. 2 and shall now be described.

FIG. 2 shows a reaction vessel 31, preferably glass lined, having separable upper and lower portions 29, 30, respectively, connected in airtight sealing engagement by a joint 32. Vessel 31 includes side arm 33 having one end extending into flask 31 and another end connected through a valve 34 to a similar but smaller reaction vessel 35. Vessels 31 and 35 are each connected between a source of nitrogen, or other suitable nonoxygen containing gas, via conduits 37 and a suitable valving arrangement 38 and a source of vacuum, via conduits 37a and a suitable valving arrangement 39.

A sealed stirring device 40 or other suitable device which permits agitation of the ingredients within the vessel without causing air to enter therein is mounted in operative relationship to the vessel 31. As shown, device 40 comprises a motor 50, supported on a motor table 51 carried by upper portion 29 of vessel 31, to which is connected in driving relationship therewith a downwardly extending shaft 52 carrying a stirring rod 53 and having at its end, where shaft 52 passes through top 29, a sealing collar 54 to prevent the ingress and egress of undesirable materials with vessel 31. A similar sealing collar 55 is employed where side arm 33 enters vessel 31.

Vessel 35 is, in the manner of vessel 31, provided with a removable top portion 42 which is connected in airtight sealing engagement to bottom portion 43 by joint 44.

In operation, vessel 31 is opened and charged with a slurry formed of a suitable borohydride or alkoxyborohydride, such as sodium trimethoxyborohydride and a suitable inert solvent such as diethylene glycol dimethylether.

Next vessel 31 is sealed by placing top portion 29 in sealed engagement upon bottom portion 30 in the manner indicated and the system is purged of oxygen as by the drawing of nitrogen or other suitable gas of the type indicated through the system. Vessel 31 is then isolated by closing valves 34, 57 and 58 to prevent the ingress of oxygen thereinto while vessel 35 is charged. Vessel 35 is then opened, charged with iron pentacarbonyl carried by the same type of solvent and resealed in the same manner described for vessel 31.

Next, valve 34 is opened to permit the iron pentacarbonyl solvent solution to flow into vessel 31 where it is mixed with the borohydride or alkoxyborohydride disposed therein as by the action of stirring device 40.

Other well known sealed stirrers made of a material which will not enter into or otherwise interfere with the desired reaction may, of course, be employed in lieu of the magnetic stirrer.

After the reagents are thoroughly mixed, as is evidenced by the color change described above, valves 34, 57 and 58 are closed (to prevent the ingress of oxygen into vessel 31) and vessel 35 is charged, as by removing top portion 42, with a suitable nonoxidizing acid such, for example, as hydrochloric acid, acetic acid and the like.

The acid is then added to the resulting mixture whereupon the green precipitate indicated above is formed.

The iron tetracarbonyl is then removed from vessel 31 in any fashion suitable for the removal of a solid precipitate from solution such as by decantation, filtration and the like, washed and the process is complete.

For a better understanding of this invention, references made to the following examples are meant only to be illustrative of the process described herein and not limiting in scope.

*Example I*

A slurry was formed with 3.0 grams of sodium borohydride ($NaBH_4$) and 15 ml. of triethylene glycol dimethylether. The slurry was charged into a vessel from which all oxygen was evacuated. Next a solution containing 3.0 grams of iron pentacarbonyl [$Fe(CO)_5$] and 15 ml. of triethylene glycol dimethylether was introduced into the vessel and mixed with the slurry. The reagents were allowed to react. The reaction was complete in about five minutes and formed a reddish solution. 28.8 millimoles of hydrochloric acid (HCl) was then added to the reddish solution to provide an excess of acid whereupon the solution turned to light green and dark green crystals precipitated therefrom. The precipitate was then separated from the solution by filtration. The green crystals thus isolated were $Fe_3(CO)_{12}$.

*Example II*

1.2 grams of $NaBH_4$ were charged in a vessel which was then provided with an atmosphere of nitrogen. To this was charged a solution containing 30 ml. of diethylene glycol dimethyl and 4.5 grams of iron pentacarbonyl.

The ingredients were then mixed and the reaction was permitted to take place. The reaction was complete in about five minutes as evidenced by the formation of solution having a deep red color. The red solution was acidified with concentrated HCl until no more gas evolved whereupon a green crystalline precipitate was formed. The solution was then filtered to separate the precipitated crystals which were $Fe_3(CO)_{12}$.

*Example III*

3.0 grams of iron pentacarbonyl were mixed with a stoichiometric excess of sodium borohydride ($NaBH_4$) and 30 ml. of triethylene glycol dimethylether in a nitrogen atmosphere. The reagents were reacted in about five minutes and formed a solution having a deep red color. To this latter solution was added a 50 percent HCl—50 percent $H_2O$ solution until gas evolution closed. The solution immediately took on a greenish hue and green crystals precipitated therefrom. The solution and precipitate were stirred in excess water for two hours to allow crystals to grow. The crystals were then filtered from the solution and dried. The crystals were $Fe_3(CO)_{12}$.

*Example IV*

1.2 grams of $KBH_4$ were charged in an atmosphere of nitrogen. To this was charged a solution containing 30 ml. of n-propylamine and a stoichiometric amount of iron pentacarbonyl.

The ingredients were mixed and the reaction was complete, as evidenced by the formation of solution having a deep red color, in about five minutes. The solution was then acidified with concentrated HCl until no more gas evolved whereupon a green crystal and precipitate were formed. The solution and precipitate were then filtered to separate the crystals. The crystals were $Fe_3(CO)_{12}$.

In the several reactions above described, preferably a stoichiometric balance of reagents is employed to achieve the most efficient use of materials although slight excesses of any given reagent have not been found deleterious to the desired result.

It is, of course, understood that the foregoing embodiments and examples are presented merely to illustrate the present invention and to facilitate understanding of it rather than to limit it; and that such variations, modification and application that occur to the artisan confronted with this teaching are intended within the spirit hereof especially as it is defined by the claims appended hereto.

Having now particularly described and ascertained the nature of our said invention and the manner in which it is to be performed, we declare that what we claim is:

1. The process for preparing iron tetracarbonyl comprising: reacting iron pentacarbonyl and a stoichiometric proportion of a compound selected from the group consisting of the alkali borohydrides, alkali alkoxyborohydrides, alkaline earth borohydrides, and alkaline earth alkoxyborohydrides in an inert nonaqueous solvent selected from the group consisting of diethylene glycol dimethylether, triethylene glycol dimethylether, liquid ammonia, n-propylamine, isopropylamine and ethylene diamine at room temperatures and pressures and in an inert atmosphere until a reddish intermediate is formed, characterized by having all infrared absorption peaks in the range below 5.4 microns; and acidifying said reddish intermediate with an amount of a nonoxidizing acid selected from the group consisting of hydrochloric acid and acetic acid effective to convert said red intermediate to green crystals, said green crystals being iron tetracarbonyl.

2. The process for preparing iron tetracarbonyl comprising: reacting iron pentacarbonyl and a stoichiometric proportion of a compound selected from the group consisting of the alkali borohydrides, alkali alkoxyborohydrides, alkaline earth borohydrides, and alkaline earth alkoxyborohydrides in an inert nonaqueous solvent selected from the group consisting of diethylene glycol dimethylether, triethylene glycol dimethylether, liquid ammonia, n-propylamine, isopropylamine and ethylene diamine at room temperatures and pressures and in an inert atmosphere until a reddish solution is formed, characterized by having all infrared absorption peaks in the range below 5.4 microns; introducing into said reddish solution an amount of a nonoxidizing acid selected from the group consisting of hydrochloric acid and acetic acid effective to precipitate green crystals from said solution; and separating said green crystals from said solution, said green crystals being iron tetracarbonyl.

3. The method according to claim 2 wherein the said inert atmosphere is nitrogen.

4. The method according to claim 2 wherein the said compound selected from the group consisting of alkali borohydrides, alkali alkoxyborohydrides, alkaline earth borohydrides and alkaline earth alkoxyborohydrides is sodium borohydride.

5. The method according to claim 2 wherein the said compound selected from the group consisting of alkali borohydrides, alkali alkoxyborohydrides, alkaline earth borohydrides and alkaline earth alkoxyborohydrides is sodium trimethoxyborohydride.

6. The process for preparing iron tetracarbonyl comprising: forming a slurry with a compound, selected from the group consisting of the alkali borohydrides, alkali alkoxyborohydrides, alkaline earth borohydrides and alkaline earth alkoxyborohydrides, and an inert nonaqueous solvent selected from the group consisting of diethylene glycol dimethylether, triethylene glycol dimethylether, liquid ammonia, n-propylamine, isopropylamine and ethylene diamine; reacting iron pentacarbonyl with said slurry in an inert atmosphere and at room temperatures and pressures until a reddish solution is formed, characterized by having all infrared absorption peaks in the range below 5.4 microns; introducing into said reddish solution an amount of a nonoxidizing acid selected from the group consisting of hydrochloric acid and acetic acid effective to precipitate green crystals from said solution; and separating said green crystals from said solution, said green crystals being iron tetracarbonyl.

7. The process for preparing iron tetracarbonyl comprising: forming a slurry with a compound, selected from the group consisting of the alkali borohydrides, alkali alkoxyborohydrides, alkaline earth borohydrides and alkaline earth alkoxyborohydrides, and an inert nonaqueous solvent selected from the group consisting of diethylene glycol dimethylether, triethylene glycol dimethylether, liquid ammonia, n-propylamine, isopropylamine and ethylene diamine; mixing a stoichiometric proportion of iron pentacarbonyl and a quantity of said inert nonaqueous solvent to form a solution independent of said slurry; reacting said slurry with said solution in an inert atmosphere and at room temperatures and pressures until a reddish solution is formed, characterized by having all infrared adsorption peaks in the range below 5.4 microns; introducing into said reddish solution an amount of a nonoxidizing acid selected from the group consisting of hydrochloric acid and acetic acid effective to precipitate green crystals from said solution; and separating said green crystals from said solution, said green crystals being iron tetracarbonyl.

References Cited in the file of this patent

UNITED STATES PATENTS

| 1,924,453 | Muth | Aug. 29, 1933 |
| 2,461,661 | Schlesinger | Feb. 15, 1949 |

OTHER REFERENCES

Kollonitsch et al.: "New and Known Complex Borohydrides and Some of Their Applications in Organic Syntheses," Nature, vol. 173, Jan. 16, 1954, page 126.